(12) United States Patent
Harris

(10) Patent No.: US 9,902,000 B2
(45) Date of Patent: Feb. 27, 2018

(54) BAND SAW BLADE SENSOR AND CONTROL SYSTEM

(71) Applicant: Maxwell T. Harris, Pryor, OK (US)

(72) Inventor: Maxwell T. Harris, Pryor, OK (US)

(73) Assignee: HE&M Inc., Pryor, OK (US)

( * ) Notice: Subject to any disclaimer, the term of this patent is extended or adjusted under 35 U.S.C. 154(b) by 277 days.

(21) Appl. No.: 14/690,873

(22) Filed: Apr. 20, 2015

(65) Prior Publication Data

US 2016/0303669 A1 Oct. 20, 2016

(51) Int. Cl.
*B23D 59/00* (2006.01)
*B23D 55/10* (2006.01)

(52) U.S. Cl.
CPC .......... *B23D 59/002* (2013.01); *B23D 55/10* (2013.01)

(58) Field of Classification Search
CPC .. B23D 59/002; B23D 55/10; B23D 57/0069; G05B 15/02
USPC .................................. 83/819, 818; 700/282
See application file for complete search history.

(56) References Cited

U.S. PATENT DOCUMENTS

| | | | | |
|---|---|---|---|---|
| 3,680,417 A | * | 8/1972 | Wells | B23D 55/084 327/509 |
| 3,954,037 A | * | 5/1976 | Rios | B23D 53/04 83/523 |
| 4,085,636 A | * | 4/1978 | Eklund | B23D 53/00 83/56 |
| 4,175,455 A | * | 11/1979 | Genis | B26D 1/46 83/110 |
| 4,289,053 A | | 9/1981 | Sawamura | |
| 4,321,849 A | * | 3/1982 | Athey | B23D 55/082 83/788 |
| 4,355,555 A | * | 10/1982 | Kobayashi | B23D 55/084 83/62.1 |
| 4,437,367 A | | 3/1984 | Hauser | |
| 4,557,168 A | | 12/1985 | Tokiwa | |
| 4,644,832 A | | 2/1987 | Smith | |
| 4,674,374 A | | 6/1987 | Sadahiro et al. | |

(Continued)

FOREIGN PATENT DOCUMENTS

| | | | | |
|---|---|---|---|---|
| EP | 2228186 A2 | * | 9/2010 | ............. B28D 1/08 |
| GB | 2228186 A | * | 8/1990 | ........... A47L 11/085 |

(Continued)

OTHER PUBLICATIONS

EWD the SawLine Company Revolutionary new system to guide the sawblade of a bandsaw FlyingBandSaw Technology http://www.ewd.de/en/company/ewd-news/ewd-news2/news-15.html.

(Continued)

*Primary Examiner* — Kenneth M Lo
*Assistant Examiner* — Mohammed Shafayet
(74) *Attorney, Agent, or Firm* — Head, Johnson, Kachigian & Wilkinson, PC

(57) ABSTRACT

A band saw blade sensor and control system to sense and control saw blade deviation of a continuous, flexible metal saw blade driven around a pair of pulleys. A pair of spaced proximity inductive sensors is positioned adjacent to a side of the saw blade in order to detect blade deviation during operation. A controller mechanism receives input from each of the pair of inductive sensors in order to control and adjust band tension on the blade, and in order to control and adjust blade force on a work piece.

8 Claims, 6 Drawing Sheets

(56) References Cited

U.S. PATENT DOCUMENTS

| | | | | |
|---|---|---|---|---|
| 5,035,166 A * | 7/1991 | Carlson | B23D 53/04 144/378 |
| 5,070,751 A * | 12/1991 | Harris | B23D 55/084 83/62.1 |
| 5,176,055 A * | 1/1993 | Wijesinghe | B23D 55/06 83/72 |
| 5,237,897 A * | 8/1993 | Wijesinghe | B23D 55/10 83/72 |
| 5,492,502 A * | 2/1996 | Hjorth | A22C 25/142 452/149 |
| 5,694,821 A * | 12/1997 | Smith | B23D 59/002 700/188 |
| 5,771,765 A * | 6/1998 | Aihara | B23D 59/006 15/21.1 |
| 5,989,116 A * | 11/1999 | Johnson | B26D 1/0006 452/150 |
| 6,105,466 A * | 8/2000 | Oppliger | B23D 63/18 76/112 |
| 6,212,437 B1 | 4/2001 | Harris | |
| 6,378,408 B2 * | 4/2002 | Smith | B23D 59/001 700/193 |
| 6,382,062 B1 * | 5/2002 | Smith | B23D 59/002 700/193 |
| 6,681,672 B2 * | 1/2004 | Myrfield | B23Q 15/013 144/356 |
| 6,701,816 B2 | 3/2004 | Smith | |
| 7,036,411 B1 | 5/2006 | Harris et al. | |
| 7,311,029 B2 * | 12/2007 | Behne | B23D 55/06 83/814 |
| 7,546,788 B2 | 6/2009 | Tokiwa | |
| 7,594,462 B2 * | 9/2009 | Snodgrass, Jr. | B23D 55/10 83/62.1 |
| 7,926,395 B2 | 4/2011 | Tokiwa et al. | |
| 7,930,963 B2 | 4/2011 | Tokiwa et al. | |
| 7,966,918 B2 | 6/2011 | Tokiwa et al. | |
| 8,117,952 B2 * | 2/2012 | Carpentier | B23Q 15/02 144/382 |
| 8,250,954 B2 | 8/2012 | Dietz et al. | |
| 8,381,624 B2 * | 2/2013 | Donovan | B23D 55/026 83/816 |
| 8,776,658 B2 | 7/2014 | Rudolph et al. | |
| 8,893,873 B1 | 11/2014 | Harris | |
| 2002/0007711 A1 * | 1/2002 | Smith | B23D 59/001 83/76 |
| 2002/0020266 A1 * | 2/2002 | Smith | B23D 59/002 83/75 |
| 2002/0059856 A1 | 5/2002 | Smith | |
| 2004/0099706 A1 * | 5/2004 | Krautkramer | B65H 16/02 226/1 |
| 2006/0144202 A1 | 7/2006 | Tokiwa et al. | |
| 2008/0017000 A1 * | 1/2008 | Goto | B23D 59/001 83/168 |
| 2008/0202306 A1 | 8/2008 | Tokiwa et al. | |
| 2008/0302227 A1 | 12/2008 | Viljanen | |
| 2009/0025399 A1 * | 1/2009 | Kamen | B01D 1/02 62/6 |
| 2009/0126549 A1 * | 5/2009 | Dietz | B23D 55/084 83/817 |
| 2010/0175530 A1 | 7/2010 | Tokiwa et al. | |
| 2012/0103111 A1 * | 5/2012 | Baller | G01L 3/102 73/862.325 |
| 2015/0020660 A1 * | 1/2015 | Jeng | B23D 59/001 83/74 |
| 2015/0027288 A1 * | 1/2015 | Jeng | B23D 55/10 83/819 |
| 2015/0158097 A1 * | 6/2015 | Myrfield | B23D 55/046 83/13 |

FOREIGN PATENT DOCUMENTS

| | | |
|---|---|---|
| RU | 2400352 C1 | 9/2010 |
| RU | 117848 U1 | 7/2012 |
| WO | WO 00/47378 | 8/2000 |

OTHER PUBLICATIONS

Wikipedia, The Free Encyclopedia Inductive Sensor https://en.wikipedia.org/wiki/Inductive_sensor.

* cited by examiner

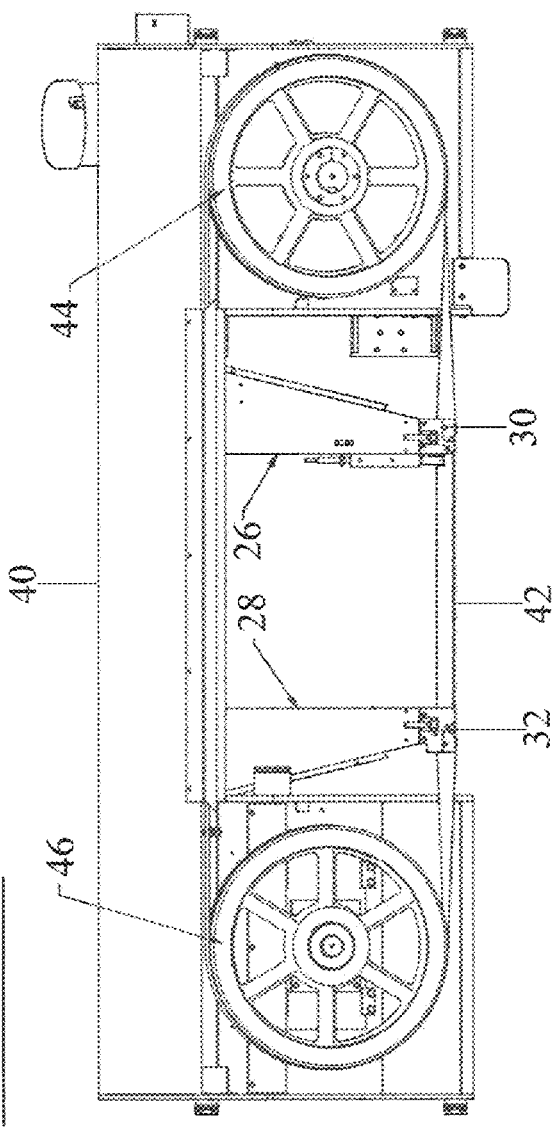
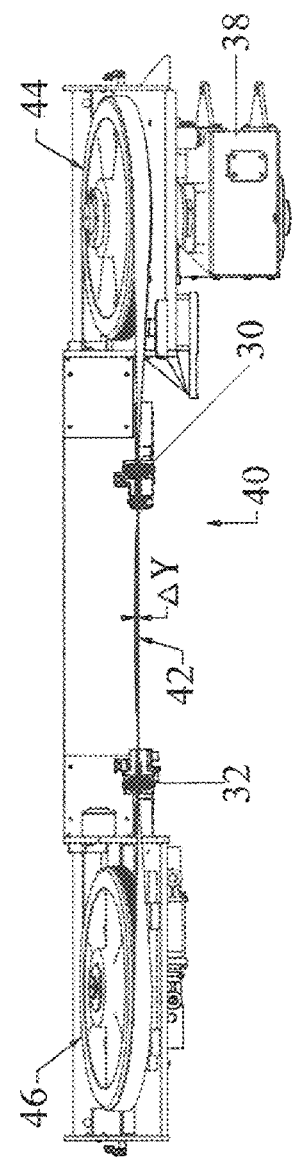
FIGURE 2B
FIGURE 2A

BAND SAW BLADE SENSOR AND CONTROL SYSTEM

BACKGROUND OF THE INVENTION

1. Field of the Invention

The present invention relates to a band saw blade sensor and control system which will sense deviation of a continuous flexible metal saw blade during a cutting operation and will implement adjustments thereto.

2. Prior Art

One type of band saw employs a flexible, continuous metal band saw blade which circulates at high speed around a pair of pulleys, at least one of which is driven by a motor.

Various types of material bar may be cut, such as large metal bars or ingots. Material to be cut may be brought to the band saw by a material handling feed table, such as shown in Applicant's prior patent—Harris (U.S. Pat. No. 8,893,873).

An existing problem with continuous metal saw blades is that the flexible blade is known to move or migrate during a cutting operation for a number of reasons. The blade itself has a front side and a back side which is adjacent to the large bar of material and the material handling feed table. Since the backside of the blade will dull with use, the blade tends to deviate toward the opposed, sharper edge.

In addition, the blade is held in tension and therefore, when the blade is pushed too fast or with too much pressure into the material, the blade will start to deviate, resulting in deflection of the saw blade.

A variety of proposals have been made in the past to alter positioning of the continuous band saw blade.

For example, Dietz et al. (U.S. Pat. No. 8,250,954) discloses a method of positioning a band saw blade. Guides 40 and 42 are positioned on opposed sides of a saw table. Guide 40 includes a machine-mounted guide block 44 and a magnet guide 46. Electromagnets exert magnetic force on the saw blade. Accordingly, the saw blade may be oriented obliquely or may compensate for a lateral evasive movement. The electromagnetic force is used to alter the position of the blade. The system would not work when cutting ferrous metal pieces, which would interfere with the magnetic forces.

Viljanen (U.S. Patent Publication No. 2008/0302227) discloses a band saw blade adjustment system with electronically controlled electric magnet element 6 providing repulsion or a pulling force on the saw blade. A mechanical or electronic distance detector senses change in the blade position. The system would only work when cutting non-ferrous materials.

Hauser (U.S. Pat. No. 4,437,367) discloses controlling the tensile strength of a saw band to prevent strain. A beam on two supports A permits sagging or bending of the saw band in a vertical plane as shown in FIGS. 8 and 9, which is sensed by a magneto-resistor field plate potentiometer 31. The feed rate velocity is thus controlled although no control of the band tension is taught or suggested.

Wijesinghe et al. (U.S. Pat. No. 5,237,897) discloses an automatic strain and saw tracking method including a strain control mechanism to maintain a desired strain and a lifting mechanism to vary the track of the saw.

Notwithstanding the foregoing, it would be desirable to provide an improved band saw blade sensor and control system utilizing inductive sensors to sense deviation of the blade during a cutting operation by utilizing magnetic fields.

It would further be desirable to provide a band saw blade sensor and control system which could take at least two actions in response to deviation of the band saw blade—the band tension could be adjusted and, second, the set point of the blade force on the work piece could be adjusted in order to bring the blade back into alignment.

It would further be desirable to provide a band saw blade sensor and control system which would select between adjustment of the band tension and adjustment of the blade force dependent on a variety of pre-selected factors.

SUMMARY OF THE INVENTION

The present invention is directed to a band saw blade sensor and control system for use with a material cutting apparatus. A continuous band saw blade travels around a drive wheel or pulley and around an idle wheel or pulley, all of which are mounted on a cutting saw head supported by at least one arm lift cylinder.

A pair of spaced apart, proximity inductive sensors are mounted adjacent to the blade.

During the cutting operation, each of the pair of inductive sensors will provide data on the position of the blade. The data from the pair of inductive sensors will indicate whether the blade has deviated from the normal path of the blade.

In response thereto, the blade tension may be increased by increasing the distance between the drive pulley or wheel and the idle pulley or wheel. Alternatively, or in addition thereto, the set point force of the blade on the work piece may be decreased. Either or both of these actions will tend to bring the blade back into alignment.

BRIEF DESCRIPTION OF THE DRAWINGS

FIG. 2A illustrates a top view and 2B illustrates a side view of the band saw assembly apart from the material cutting apparatus;

DETAILED DESCRIPTION OF THE PREFERRED EMBODIMENTS

Figure 1:
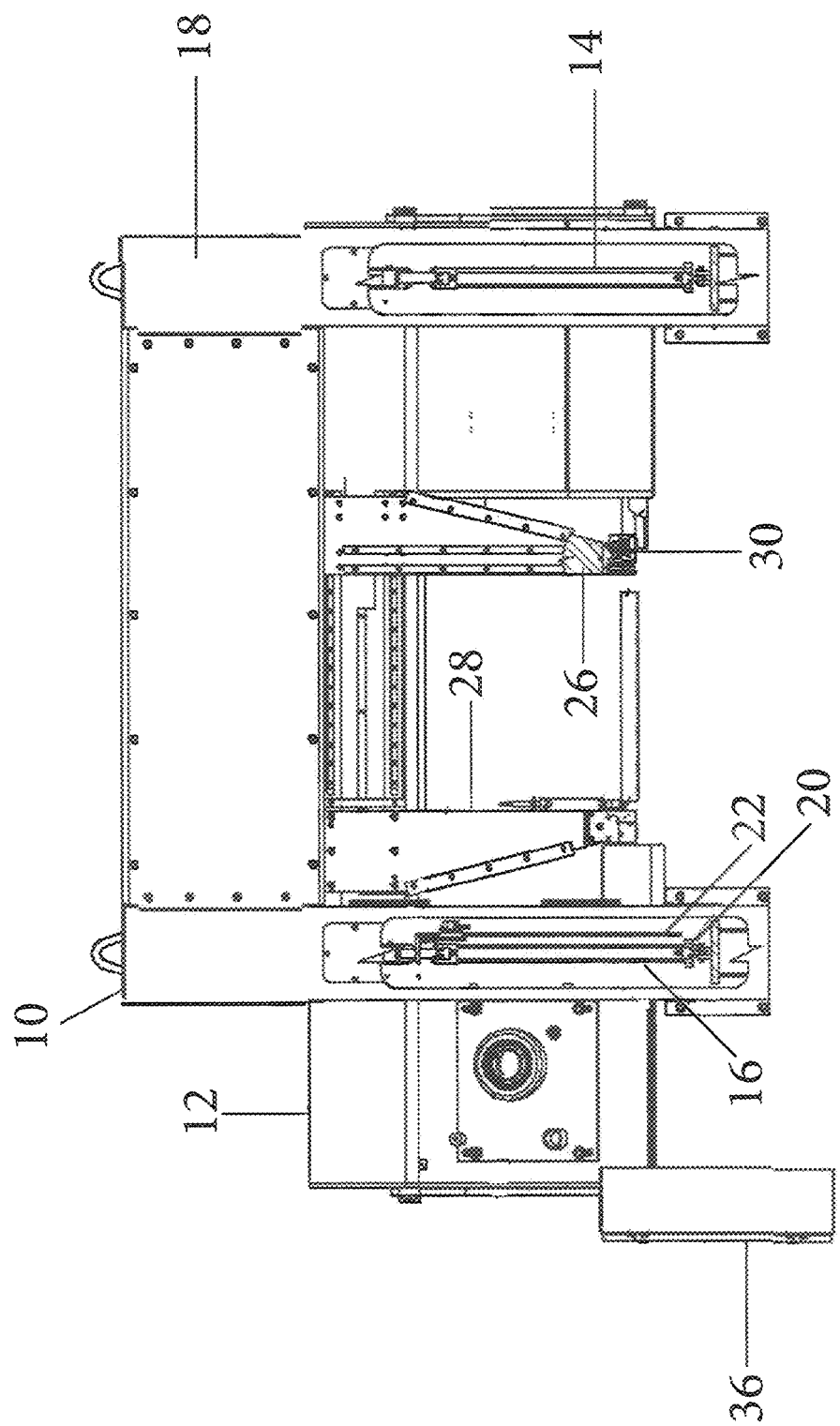
FIG. 1 is a simplified diagram of a material cutting apparatus incorporating a band saw blade sensor and control system of the present invention.

Referring to the drawings in detail, FIG. 1 illustrates a simplified diagram of a material cutting apparatus 10 which incorporates a band saw blade sensor and control system of the present invention. A cutting saw head 12 is supported by and moveable by a pair of arm lift cylinders 14 and 16, which are attached to a frame 18. The cutting saw head 12 may be moved toward or away from the work piece (not shown) to be cut. The arm lift cylinders 14 and 16 may be hydraulic or other type of cylinders within the scope of the invention. One or both of the arm lift cylinders 14 and 16 includes a force or pressure sensor 20 which senses pressure in the hydraulic cylinder in order to measure force on the work piece. Another sensor or sensors in the form of a rate sensor 22 senses the velocity. A controller 36 in a control or electric box or panel is in communication with the sensors 20 and 22.

FIG. 2A illustrates a top view and 2B illustrates a side view of a band saw assembly 40 apart from the material cutting apparatus 10.

A continuous band saw blade 42 travels around a drive wheel or pulley 44 and around an idle wheel or pulley 46. The drive wheel or pulley 44 is driven by a motor 38. A pair of blade guides 48 and 50 are provided. A pair of proximity inductive sensors 30 and 32 are mounted adjacent to the blade 42. The inductive sensors 30 and 32 are spaced from each other. Each inductive sensor includes an induction loop having a magnetic field to sense the position of the metal blade 42.

The blade 42, the pulleys 44 and 46, and the guides 48 and 50 are all mounted on the cutting saw head 12.

Under certain operating conditions, the path of the blade 42 may deviate as shown by the dashed lines in FIG. 2A. The symbol ΔY denotes the amount of deviation.

Figure 3:
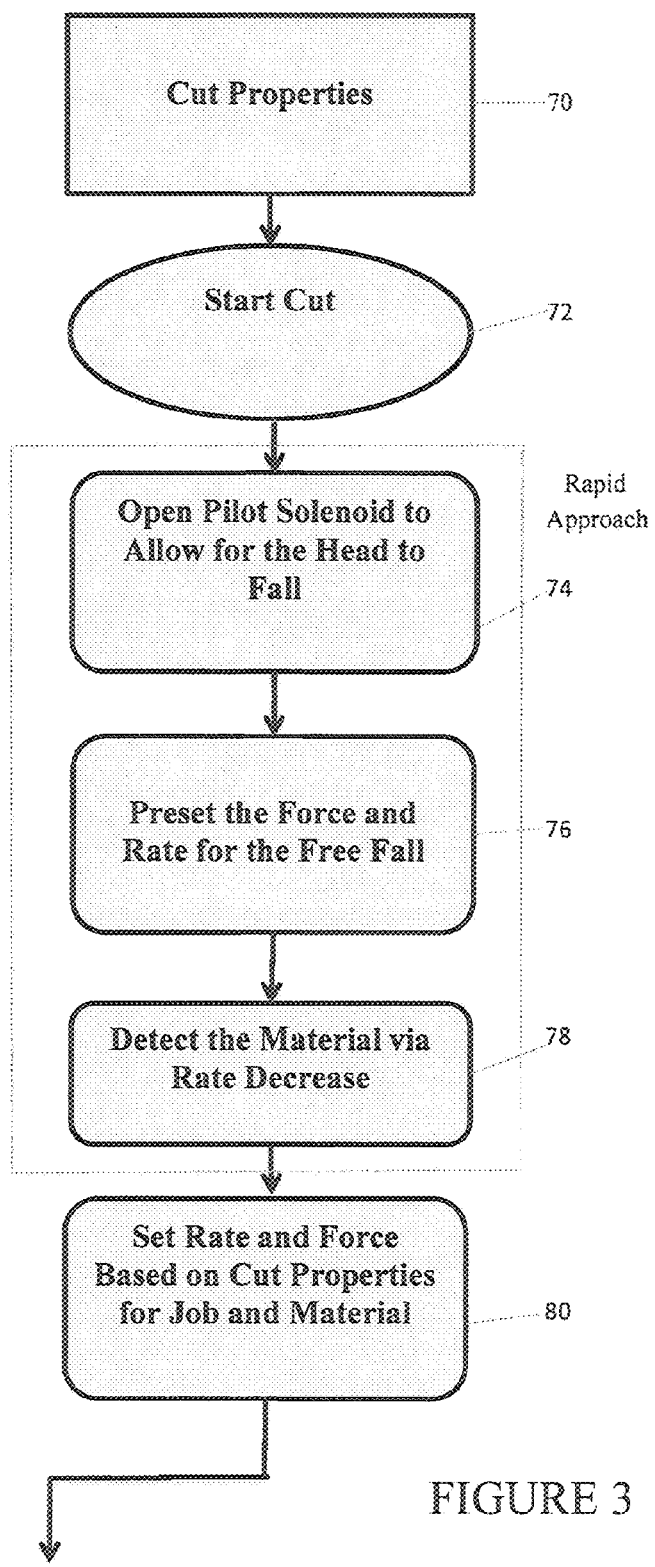
FIGS. 3, 4A and 4B illustrates a sequential flow chart of the process to sense and control blade deviation of the continuous, flexible metal saw blade in accordance with the present invention.
Figure 4A:
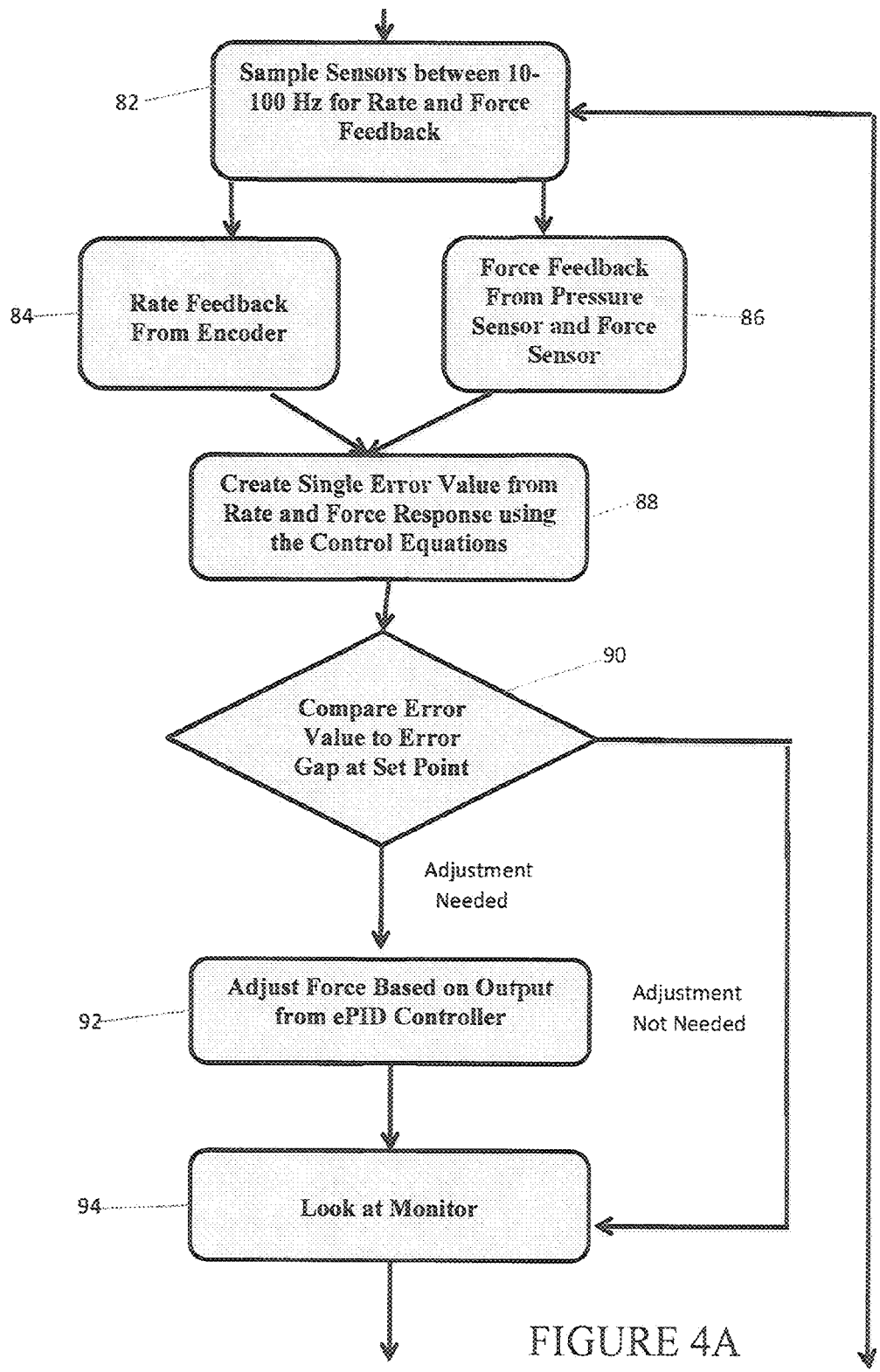
Figure 4B:
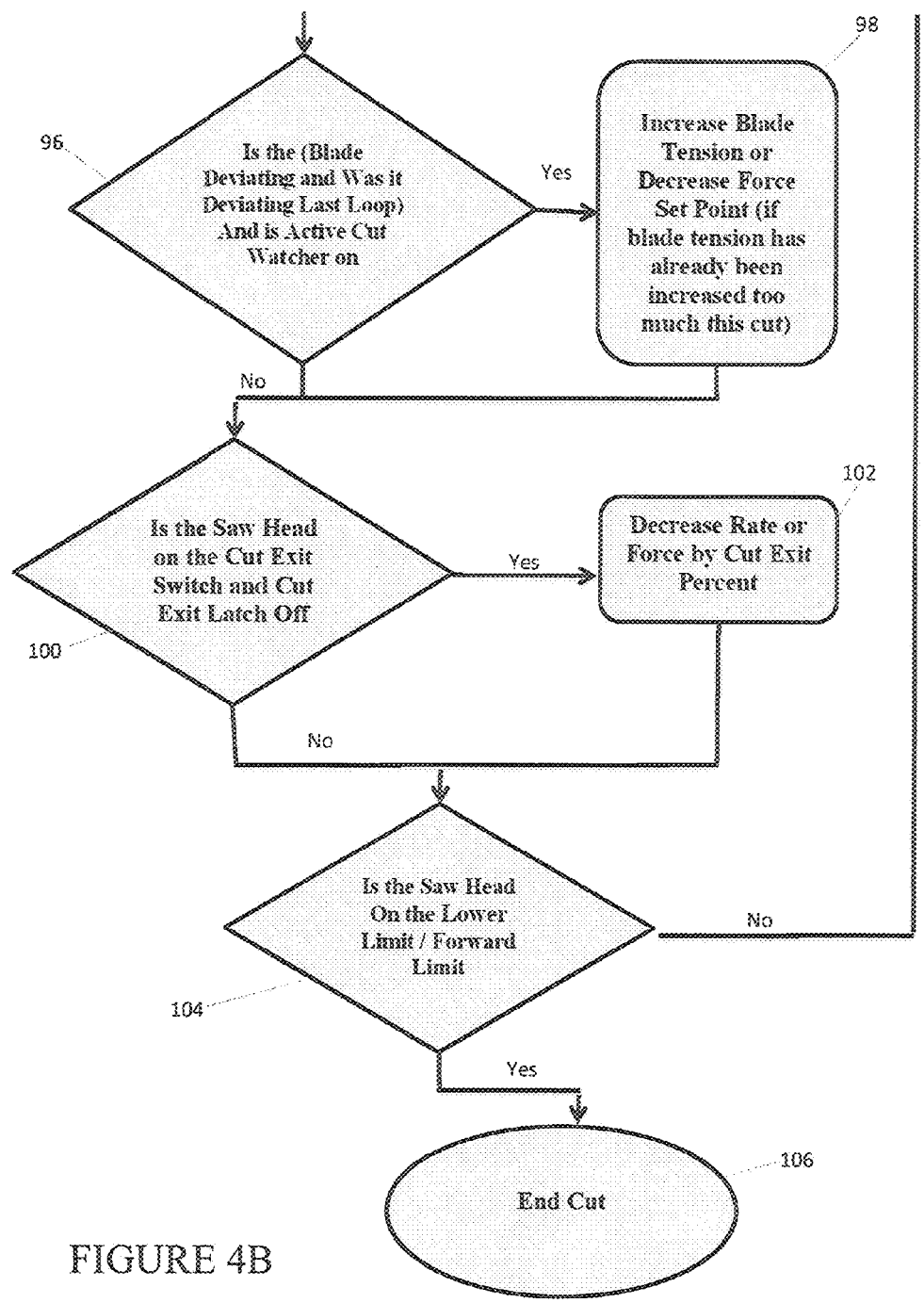

FIGS. 3, 4A and 4B illustrate sequential flow charts of the process to sense and control blade deviation of a continuous, flexible metal saw blade in accordance with the present invention. Initially, the cut properties of the cut to be performed may be entered in a controller 36 as shown at box 70. The controller 36 will include a central processing unit with memory.

The cut properties include job data, material information and manual parameters to be entered. The job data may include the material height, the material width, the angle or angles to be cut, the lengths, and cutting speeds and feeds for the particular material of the particular job. For example, a 5 inch wide material may be utilized with 90° cuts on the front and the back of the part, at a length of 25 inches plus the blade kerf, with the particular blade speed, particular rate and force for a particular type of steel. A library of cut property parameters may also be stored in memory or may be accessed from a database in the controller 36.

Thereafter, as shown at oval 72, a start cut switch will be activated by an operator to initiate the cutting operation.

A sequence will then be employed to permit the cutting saw head 12 to rapidly approach the work piece material to be cut.

A pilot solenoid will be open to allow the cutting saw head 12 to descend by gravity, as shown at box 74. The cutting head 12 will then fall by gravity based on a preset force and rate or velocity.

The rate sensor 22 will assist to detect engagement with the material when the rate of descent decreases, as shown in box 78.

Thereafter, the rate and force of the cutting head 12 will be employed during the cutting operation based on the desired cut properties previously entered as described above, as shown at box 80.

FIG. 4a illustrates the progressive sequence thereafter. As shown at box 82, at least a pair of sensors will periodically take measurements. At least one rate sensor 22 will sense the rate or velocity of the cutting saw head 12 moving through the material. At least one other force sensor 20 will sense the force of the cutting saw head on the material.

As seen in box 84, speed or velocity information will be obtained from rate sensor 22 using an encoder or encoders on the cutting saw head 12. As seen in box 86, force or pressure feedback information will be obtained from the pressure sensor or sensors 20 located on one or both of the hydraulic cylinders 14 and 16.

Thereafter, a single feedback variable or error value will be compiled from the rate feedback and force feedback as seen at box 88.

As seen at diamond 90, the compiled error value will be compared to an error gap parameter. If needed, an adjustment in the force will be made as seen at box 92. If no adjustment is necessary, further steps of the process will be employed.

As shown at box 94, the data from the pair of proximity inductive sensors 30 and 32 will be accessed. By comparing the data from each of the inductive sensors 30 and 32, it may be determined if deviation has occurred.

Figure 5:
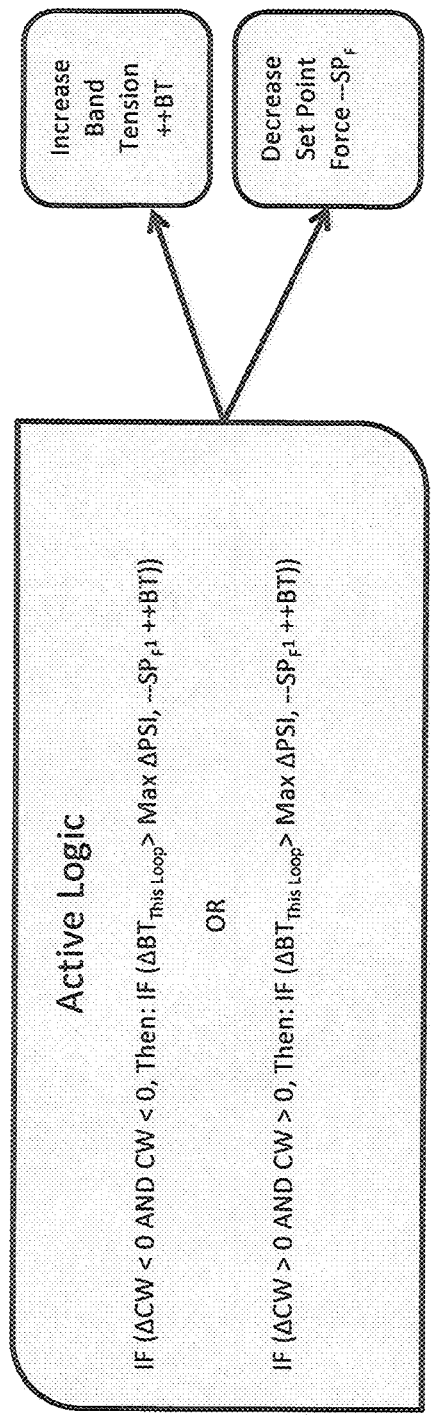
FIG. 5 illustrates the sequential logic or process for the decision to increase band tension or decrease set point force in accordance with the present invention.

The process continues as shown in FIG. 4B. The pair of inductive sensors 30 and 32 will each provide data on the position of the blade as shown at diamond 96. The formula for determining whether deviation of the saw blade has occurred is shown in FIG. 5 where: BT is band tension; $SP_F$ is set point force; PSI is pounds per square inch; and CW is the data gathered from the inductive sensors.

As seen at box 98 in FIG. 4b, the blade tension may be increased or the set force point may be decreased (which decreases the rate) or both actions may be taken. In order to adjust the blade or band tension, the relative positions of the pulleys 44 and 46 to each other are adjusted. In order to decrease the set point force, the force exerted by the cylinder or cylinders 14 and 16 is decreased. Another factor to consider is that increasing the band tension will allow for increasing the beam strength, allowing for a higher set point force before deviation of the blade occurs.

Thereafter, if the end of the cut operation is approaching, a cut exit switch will be accessed. When the cut exit is approached, then the force will be decreased as shown at boxes 100 and 102. If the saw head is on a lower limit, as shown at diamond 104, then the cut operation will be ended. If not, the process will return to again access sensors for the rate feedback and force feedback as shown at box 82.

The present invention provides a sensor and control system which sense deviation of the saw blade and dynamically adjusts thereto.

Whereas, the present invention has been described in relation to the drawings attached hereto, it should be understood that other and further modifications, apart from those shown or suggested herein, may be made within the spirit and scope of this invention.

What is claimed is:

1. A band saw blade sensor and control system to sense and control saw blade deviation of a continuous, flexible metal saw blade driven around a pair of pulleys, which system comprises:

a pair of spaced proximity inductive sensors adjacent to a side of said saw blade to detect blade deviation; and a controller mechanism to receive input regarding said blade from each of said pair of sensors, to control and adjust band tension on said blade in response to said blade deviation, and to control and adjust blade force on a work piece in response to said blade deviation, wherein said controller mechanism operates according to the formula IF (ΔCW<0 AND CW<0, Then: IF (ΔBT$_{This\ Loop}$>Max ΔPSI, --SP$_F$!++BT))

or

IF (ΔCW>0 AND CW>0, Then: IF (ΔBT$_{This\ Loop}$>Max ΔPSI, --SP$_F$!++BT))

where BT is band tension, SPF is set point force, PSI is pounds per square inch, and CW is the data gathered from said proximity sensors.

2. A band saw blade sensor and control system as set forth in claim 1 wherein each of said pair of inductive sensors includes an induction loop having a magnetic field to sense position of said saw blade.

3. A band saw blade sensor and control system as set forth in claim 1 wherein said controller mechanism to adjust band tension on said blade adjusts position of said pair of said pulleys with respect to each other.

4. A band saw blade sensor and control system as set forth in claim 3 wherein said pulleys include a drive pulley driven by a motor and an idler puller positioned by a hydraulic cylinder.

5. A process to sense and control blade deviation of a continuous, flexible metal saw blade driven around a pair of pulleys, which process comprises:

sensing position of said continuous, flexible metal saw blade with a pair of spaced proximity inductive sensors adjacent to a side of said blade to detect blade deviation;

delivering said position information of said blade from said sensors to a controller;

varying a set point of blade force on a work piece in response to said blade deviation;

varying the band tension of said blade in response to said blade deviation, wherein said steps operate according to the formula IF ($\Delta$CW<0 AND CW<0, Then: IF ($\Delta BT_{This\ Loop}$>Max $\Delta$PSI, $--SP_F$-1++BT))

or

IF ($\Delta$CW>0 AND CW>0, Then: IF ($\Delta BT_{This\ Loop}$>Max $\Delta$PSI, $--SP_F$-1++BT))

where BT is band tension, SPF is set point force, PSI is pounds per square inch, and CW is the data gathered from said proximity sensors.

6. A process to sense and control blade deviation of a continuous, flexible metal saw blade as set forth in claim 5 wherein each of said pair of inductive sensors includes an induction loop having a magnetic field.

7. A process to sense and control blade deviation of a continuous, flexible metal saw blade as set forth in claim 5 wherein said pair of pulleys include a drive pulley driven by a motor and an idler pulley positioned by a hydraulic cylinder.

8. A process to sense and control blade deviation of a continuous, flexible metal saw blade as set forth in claim 5 wherein said step of varying the band tension of said blade includes varying pressure in at least one hydraulic cylinder.

* * * * *